(12) United States Patent
Dietrich

(10) Patent No.: US 8,584,643 B2
(45) Date of Patent: Nov. 19, 2013

(54) METHOD AND DEVICE FOR STARTING AN INTERNAL COMBUSTION ENGINE

(75) Inventor: Manfred Dietrich, Markgroeningen (DE)

(73) Assignee: Robert Bosch GmbH, Stuttgart (DE)

(*) Notice: Subject to any disclaimer, the term of this patent is extended or adjusted under 35 U.S.C. 154(b) by 1030 days.

(21) Appl. No.: 12/619,348

(22) Filed: Nov. 16, 2009

(65) Prior Publication Data

US 2010/0132647 A1    Jun. 3, 2010

(30) Foreign Application Priority Data

Dec. 2, 2008 (DE) .......................... 10 2008 044 249

(51) Int. Cl.
*F02N 11/08* (2006.01)
*F02N 11/00* (2006.01)

(52) U.S. Cl.
USPC ....................................................... 123/179.3

(58) Field of Classification Search
USPC ................... 123/179.3, 179.4; 701/112, 113
See application file for complete search history.

(56) References Cited

U.S. PATENT DOCUMENTS

| | | | |
|---|---|---|---|
| 6,981,481 B2 * | 1/2006 | Kojima et al. ............. | 123/179.3 |
| 7,275,509 B2 * | 10/2007 | Kassner ................... | 123/179.25 |
| 7,934,436 B2 * | 5/2011 | Laubender ................. | 74/7 R |
| 8,290,692 B2 * | 10/2012 | Kitano et al. ................ | 701/113 |
| 2007/0137602 A1 * | 6/2007 | Kassner ................... | 123/179.25 |
| 2007/0151536 A1 * | 7/2007 | Yamauchi et al. .......... | 123/179.4 |
| 2008/0127927 A1 * | 6/2008 | Hirning et al. ............. | 123/179.3 |
| 2010/0050970 A1 * | 3/2010 | Okumoto et al. .......... | 123/179.4 |
| 2010/0059007 A1 * | 3/2010 | Senda et al. ............... | 123/179.4 |
| 2010/0083926 A1 * | 4/2010 | Okumoto et al. .......... | 123/179.4 |
| 2010/0186703 A1 * | 7/2010 | Heusel et al. ............. | 123/179.3 |

FOREIGN PATENT DOCUMENTS

| | | |
|---|---|---|
| DE | 10 2006 047 608 | 4/2008 |
| JP | 2002-70699 | 3/2002 |
| JP | 2005-330813 | 12/2005 |
| WO | 2008/043589 | 4/2008 |

* cited by examiner

*Primary Examiner* — Stephen K Cronin
*Assistant Examiner* — Arnold Castro
(74) *Attorney, Agent, or Firm* — Kenyon & Kenyon LLP

(57) ABSTRACT

In a method, a device, a computer program and a computer program product for operating an internal combustion engine having a starter: a first threshold value and a second threshold value are specified; a first variable and a second variable are determined, which characterize the operating state of the internal combustion engine; the first variable is compared to the specified first threshold value and the second variable is compared to the specified second threshold value; and the starter starting, or not starting, the internal combustion engine as a function of the comparison result.

17 Claims, 3 Drawing Sheets

METHOD AND DEVICE FOR STARTING AN INTERNAL COMBUSTION ENGINE

CROSS-REFERENCE TO RELATED APPLICATIONS

The present application claims priority to Application No. 10 2008 044 249.6, filed in the Federal Republic of Germany on Dec. 2, 2008, which is expressly incorporated herein in its entirety by reference thereto.

BACKGROUND INFORMATION

The present invention relates to a method and device for starting an internal combustion engine.

BACKGROUND INFORMATION

German Published Patent Application No. 10 2006 047 608 describes a device and a method for starting an internal combustion engine, in which a pinion starter starts the internal combustion engine. The pinion starter includes a DC motor having a pinion, which is brought into engagement with a ring gear of the internal combustion engine and, in response to a startup request, cranks the internal combustion engine. The ring gear of the internal combustion engine is usually situated at the crankshaft. Moreover, conventional pinion starters include a so-called solenoid switch, which pulls up an engaging lever that engages the pinion in the ring gear of the internal combustion engine. As soon as the engagement relay has pulled up, a main current path, which supplies the starter with electric power, is automatically closed. This starts the actual cranking process.

Prior to the pinion engaging with the ring gear, conventional engine control systems check whether the internal combustion is at a standstill. This effectively reduces negative effects to be expected with respect to the service life of the mechanical subsystem as a result of, for example, thermal and/or mechanical loading of the mechanical subsystems.

In the case of current engine control systems, the standstill of the internal combustion engine is determined in that, following a run-down of the engine, for instance, an incremental encoder detects no sweeping gear tooth for a longer period of time, typically 200 ms. This dead time between detecting the standstill of the internal combustion engine and the earliest moment of the renewed startup is too long for comfortable start-stop systems or for direct start systems.

SUMMARY

According to example embodiments of the present invention, an internal combustion engine having a starter is operated such that: a first threshold value and a second threshold value are specified; a first variable and a second variable are determined, which characterize the operating state of the internal combustion engine; the first variable is compared to the specified first threshold value, and/or the second variable is compared to the specified second threshold value; and the starter starts, or does not start, the internal combustion engine as a function of the comparison result.

In this manner a comfortable start-stop or direct start system is realized, in which the start of the internal combustion engine is able to take place even if the internal combustion engine has not yet reached a standstill. The time period between the stop and the renewed start of the internal combustion engine can thereby be reduced from approximately 200 ms to approximately 10 to 100 ms.

The starter may start the internal combustion engine only if the first variable undershoots the first specified threshold value or if the second variable undershoots the specified second threshold value.

When the first threshold value is not attained, it is ensured that the starter starts the internal combustion only when the internal combustion engine has reached a standstill. When the second threshold value is not attained, it is ensured that the starter starts the internal combustion engine only if the relative rotational speed between the starter and the internal combustion engine or the crankshaft is sufficiently low. This prevents damage to the internal combustion engine or the starter or other mechanical subsystems by thermal and/or mechanical stressing.

The specified first threshold value and the specified second threshold value may be selected to be greater than zero. This makes it possible for the starter to start the internal combustion engine already when the internal combustion engine is still in a rotary motion that, as far as the relative rotational speed is concerned, lies below the critical conditions for thermal or mechanical damage.

The internal combustion engine may be operated in an operating state in which no combustion takes place. Thus, the starting operation is carried out only if the internal combustion engine is not already in operation.

An incremental encoder may be situated on a crankshaft in the internal combustion engine, and a time period may be selected as first variable that elapses after a first gear tooth of the incremental encoder has been detected. The time period that elapses after detection of the first gear tooth of the incremental encoder is an especially reliable variable having fine resolution for evaluating the operating state of the internal combustion engine. In particular, the standstill of the internal combustion engine is detected in an especially simple manner by comparing this variable to a dead time, which is specified as first threshold value.

The second variable may be selected as a function of a relative rotational speed, i.e., a difference in the rotational speeds between the starter and the crankshaft. The difference in the rotational speeds between the starter and the crankshaft maximally tolerated in view of thermal or mechanical damage is specified by the manufacturer of the starter or the crankshaft and amounts to 50/min, for instance. Therefore, this variable is especially suitable for evaluating the operating state of the internal combustion engine at a rotational speed other than zero.

The first specified threshold value may be selected as a function of a rotational speed of the crankshaft and/or a position of the crankshaft, in particular between 10 ms and 100 ms. The rotational speed of the crankshaft and/or the position of the crankshaft determine(s) the length of the time period that elapses while a magnet wheel of the incremental encoder moves through an angular range between two consecutive gear teeth of the magnet wheel. For example, the time period becomes longer with decreasing rotational speed. Moreover, in the case of a magnet wheel for which one or a plurality of tooth gaps is provided, the time period also changes as a function of the position of the crankshaft, since the time period for moving through the angular ranges of the tooth gap are longer. Taking this dependency into account ensures a very reliable detection of the standstill of the internal combustion engine with a very fine resolution.

A third variable may be determined as a function of the time interval between the detection of two consecutive gear teeth of the incremental encoder, and the first specified threshold value may be determined as a function of at least two values of the third variable, especially by extrapolation, using an approximation function of the first and/or second order, in particular. On this basis, a simple inference is made with regard to the time interval to be expected until the detection of the next gear tooth, based on the time interval between the detection of two consecutive gear teeth in the past, by extrapolation using the approximation function. The time interval to be expected lies in a range between the result of the linear extrapolation and the quadratic extrapolation. The use of an approximation function of the first and/or second order permits an efficient implementation in a control device. This spares the computing resources while providing sufficient accuracy.

The first specified threshold may be selected as a function of the larger value of the two results from the extrapolation, using the approximation function of the first and second order. Because of this maximum value generation, the first specified threshold value is selected such that it is always the longer expected interval that is selected, both for a convex tooth period characteristic (traveling through a low point) and also for a concave tooth period characteristic (traveling through a high point). This ensures that a standstill is not detected prematurely.

The first specified threshold value may be corrected as a function of a tolerance factor. By additionally taking a tolerance factor into account, it is possible to compensate for additional imprecisions arising from the approximation function or from tolerances in the signal acquisition. The time interval thus obtained is then able to be used as the new first specified threshold value.

The second specified threshold value may be selected as a function of the mechanical loading capacity of the starter and/or the crankshaft. The maximum mechanical loading capacity of the starter and/or the crankshaft is specified by the manufacturer of these components, for instance. Through the selection of the specified second threshold value the difference in the rotational speeds between the starter and the crankshaft is kept low enough to avoid damage during the startup of the internal combustion engine. For example, the difference in the rotational speed amounts to 50/min.

A check may take place as to whether a start has been requested before operating the starter. This excludes the possibility that the starter starts the internal combustion engine when the first threshold or the second threshold is undershot, although, for instance, no start was requested by the driver of a vehicle in which the internal combustion engine has been installed. An undesired startup of the internal combustion engine is therefore prevented in a reliable manner.

The starter may be a pinion starter. A pinion starter is a particularly effective and easily implementable mechanical component, which is suitable for start-stop and direct start methods, in particular.

Exemplary embodiments of the present invention are described below in more detail with reference to the appended Figures.

DETAILED DESCRIPTION

Figure 1:
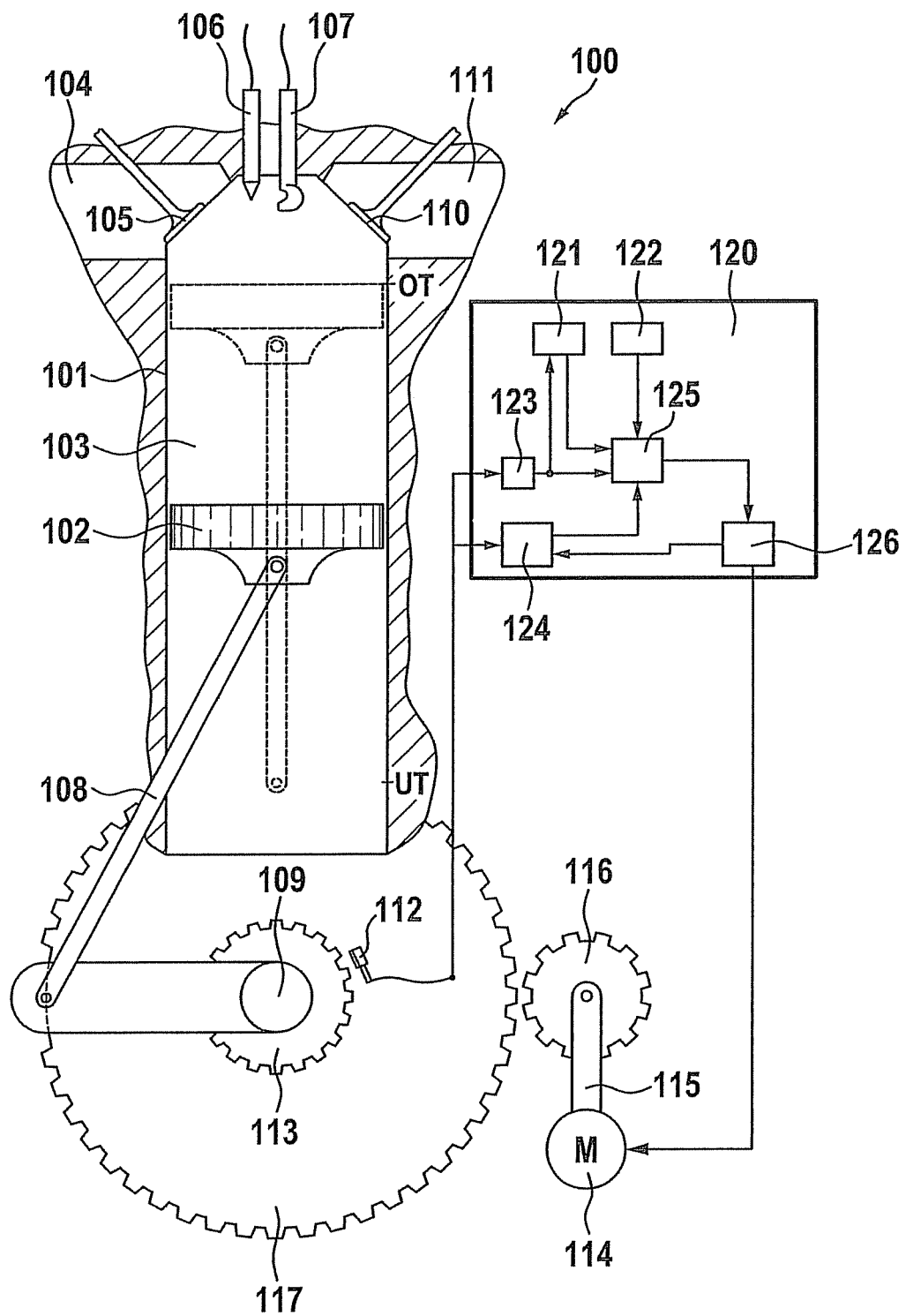
FIG. 1 schematically illustrates an internal combustion engine.

In FIG. 1, an internal combustion engine is shown schematically and denoted by 100. Internal combustion engine 100 includes a cylinder 101 and a piston 102, which enclose a combustion chamber 103.

Fresh air is introduced into combustion chamber 103 through an intake manifold 104 via an intake valve 105. In addition, fuel is introduced into combustion chamber 103 via a fuel injector 106.

A fuel/air mixture produced in combustion chamber 103 in this manner is ignited by a spark plug 107, for example. A thermal energy generated in combustion chamber 103 by the combustion of the fuel/air mixture is at least partially converted into mechanical energy by piston 102. The resulting downward motion of piston 102 inside cylinder 101 is converted into a rotary motion of a crankshaft 109 via a connecting rod 108. Piston 102 travels from top dead center OT to bottom dead center UT inside cylinder 101.

In an upward movement of piston 102 ensuing after the fuel/air mixture has combusted, a discharge valve 110 expels exhaust gas produced by the combustion into an exhaust pipe 111.

FIG. 1 describes internal combustion engine 100 using the example of a four-stroke Otto engine having externally supplied ignition and direct injection. However, the method and the device hereof are analogously applicable to other internal combustion engines as well, such as two-stroke combustion engines or internal combustion engines having intake manifold injection, and also to Diesel engines. For reasons of clarity, only one cylinder 101 of internal combustion engine 100 is shown in FIG. 1. The device and the method are used in analogous manner for multi-cylinder internal combustion engines.

The control of intake valve 105 and discharge valve 110 is carried out in, e.g., a conventional manner, for instance via a camshaft not illustrated in FIG. 1. As an alternative, a variable valve drive may be employed as well.

The control of fuel injector 106 and spark plug 107 is implemented, e.g., in a conventional manner, for instance with the aid of an engine control device. This procedure will not be discussed here in greater detail.

An incremental encoder 112, which induces an electrical signal with the aid of, for example, a magnet wheel 113, is disposed on crankshaft 109. The direction of rotation may also be determined, e.g., in a conventional manner, with the aid of an intelligent speed sensor, for example. Magnet wheel 113 is developed as toothed wheel having 60/2 teeth, for example. This means that magnet wheel 113, and thus the position of crankshaft 109, is subdivided into 60 angular segment of equal size, each representing a 6° arc of crankshaft rotation.

Magnet wheel 113 is coded by a tooth gap, i.e., two missing teeth, such that top dead center OT of piston 102 is attained when, for instance, two falling flanks of an electric signal were detected after a detected tooth gap, and a 72° arc of crankshaft rotation has passed in addition.

The method is used in analogous manner also for other codings of the magnet wheel. The method and the device may also be used for other incremental encoders 112 which do not operate according to the magnet principle. For example, it is possible to use incremental encoders 112 that utilize imaging measuring principles with the aid of a light source and photo-optical components.

Furthermore, an electric motor 114, which is connected to a pinion 116 via a shaft 115, is situated inside internal combustion engine 100. Electric motor 114, shaft 115, and pinion 116 are part of a pinion starter, which is brought into engagement with a ring gear 117 permanently joined to crankshaft 109 for the startup of internal combustion engine. A solenoid switch is actuated for this purpose, which pulls up an engaging lever, thereby bringing pinion 116 into engagement with ring gear 117.

Instead of the pinion starter shown in FIG. 1, it is also possible to utilize other starters. The method and the device are used in analogous manner in those instances as well.

FIG. 1 shows a control device 120, which has a first setpoint selection device 121, a second setpoint selection device 122, a first determination device 123, a second determination device 124, a comparator 125, and a third setpoint selection device 126.

From the signal of the incremental encoder 112, first determination device 123 determines a first variable, which is also referred to as tooth period TZ in the following text. Tooth period TZ is a time period representing the time interval between the detection of two consecutive teeth of incremental encoder 112. This tooth period TZ is determined in the known manner, for instance from the intervals of two falling flanks of a voltage signal of incremental encoder 112. Control device 120 has a clock generator for this purpose, which is not shown in FIG. 1 and which provides information about the elapsed time to first determination device 123. First determination device 123 transmits tooth period TZ to comparator 125 and to first setpoint selection device 121.

Second determination device determines engine speed n of the internal combustion engine from the signal of incremental encoder 112, in the usual manner. For this purpose, tooth periods TZ, for instance, are determined in the same manner as in first determination device 123, whereupon an average tooth period TZ is determined by forming an average value. For a 60-2 magnet wheel, the rotational speed, in rotations per minute, then directly results as inverse value of the average value of tooth periods TZ. Moreover, in a conventional manner, it is monitored whether internal combustion engine 100 is in a reverse pendular motion. No engine speed n will be determined if this is the case, but the engine speed signal is set to an invalid value, for example. Second determination device 124 then compares the engine speed of internal combustion engine 100 to the engine speed of electric motor 114. Since electric motor 114 is controlled by control device 120 with the aid of third setpoint selection device 126, the engine speed of electric motor 114 is formed in a conventional manner, by modeling, from the control signal for electric motor 114. It is assumed, for instance, that the engine speed of electric motor 114 corresponds to the setpoint engine speed. To this end, second determination device 124 receives the setpoint engine speed from third setpoint selection device 126. As an alternative, an additional incremental encoder and an additional determination device may be provided, with whose aid the engine speed of electric motor 114 is determined. The engine speed of electric motor 114 typically corresponds to the rotational speed of pinion 116.

As a second variable, second determination device 124 determines the difference between the engine speed of internal combustion engine 100 and the engine speed of electric motor 114 and in this manner determines the relative rotational speed or the rotational speed difference between the starter and the crankshaft. The difference in the rotational speeds between the starter and the crankshaft is transmitted to comparator 125 by second determination device 124.

First setpoint selection device 121 specifies a first threshold value. The first specified threshold value is also referred to as dead time in the following text.

The first specified threshold value is selected as a function of the rotational speed of the crankshaft and/or a position of the crankshaft, for instance between 10 ms and 100 ms. A third variable is determined for this purpose as a function of the time interval between the detection of two consecutive teeth of magnet wheel 113. It is determined by first determination device 123 as tooth time TZ and transmitted to first setpoint selection device 121. Using three values of the third variable, or tooth period TZ, an inference as to the expected time interval until incremental encoder 112 detects the next tooth is then made via extrapolation with the aid of an approximation function. To this end, a first result is determined from an approximation function of the first order, and a second result from an approximation function of the second order. The approximation function of the first order is a linear function, for instance. For example, a straight line is selected that runs approximately through the last three detected tooth periods TZ. A square function, which is defined by the last three values of tooth periods TZ, for instance, is selected as approximation function of the second order, for example.

Figure 3:
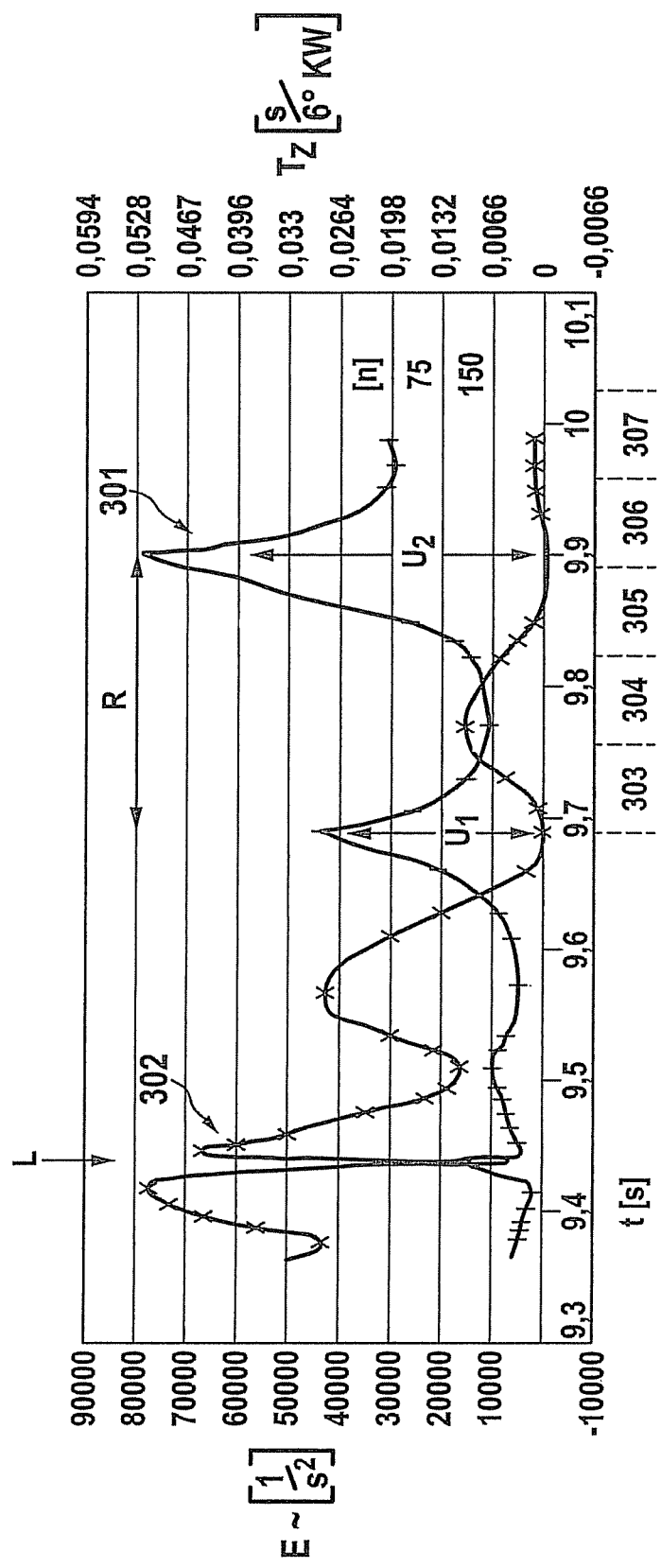
FIG. 3 is a diagram of a time characteristic of performance quantities of the internal combustion engine.

For storing the data, a memory is provided in control device 120, in which individual tooth periods TZ are stored until the approximation function is calculated. For a function of the second order, for example, the three last tooth periods TZ are stored in the memory. It is provided that any new tooth period TZ replaces the oldest tooth period TZ in the memory. Provided sufficient memory and computing capacity are available, additional past values of tooth periods TZ may be taken into account as well. Given sufficient computing resources, it is also possible to determine only one approximation function, e.g., with the aid of a least-square approximation method. In this case, the first specified threshold value is determined as a function of the result of the extrapolation, using this one approximation function. FIG. 3 shows a first time characteristic 301 of tooth periods TZ above advancing time 5. Moreover, a second time characteristic 302 of a variable that is proportional to kinetic energy E of internal combustion engine 100 is shown in FIG. 3. Because of friction and the lack of new energy input through combustion, kinetic energy E decreases strongly when internal combustion engine 100 is running down. Furthermore, kinetic energy E is defined by the effective mass moment of inertia of crankshaft 109 of piston 102 of connecting rod 108 and possibly a dual-mass flywheel as well as other variables. The angular velocity of this rotating system is defined by its kinetic energy E. The relationship between kinetic energy E and the angular velocity or tooth periods TZ is shown in FIG. 3.

The run-down of internal combustion engine 100 starts with the end of the combustion of the fuel-air mixture inside combustion chamber 103. Engine speed n of internal combustion engine 100 then decreases, which corresponds to a prolongation of tooth periods TZ. At very slow engine speeds n, e.g., 150 rotations per minute, the mechanical system made up of piston 102, connecting rod 108, crankshaft 109 and flywheel, begins a pendular motion. This pendular motion is due to the fact that kinetic energy E of the not fired internal combustion engine 100 is no longer sufficient to move the piston beyond top dead center OT. If kinetic energy E is insufficient to move the piston beyond top dead center OT, then a reverse pendular motion arises, which takes place between return point U1 and a second return point U2 in FIG. 3 and is denoted by R. During this reverse pendular motion R, crankshaft 109 moves counter to the direction of rotation that prevails during fired operation of internal combustion engine 100. In the reverse pendular motion, the energy of the compressed air in the cylinder (gas spring) is converted into mechanical energy.

Tooth periods TZ arising during the run-down of internal combustion engine 100 are illustrated in the form of points in FIG. 3 on first time characteristic 301. The connecting lines between the pints represent an approximation function of the second order, for instance, for tooth periods TZ. The tooth gap of magnetic wheel 113 is denoted by L in FIG. 3.

First time characteristic 301 of tooth periods TZ is subdivided into five consecutive ranges after first return point U1. A first range 303 denotes an interval during which crankshaft 109 is in an accelerated state of motion. This means that expected next tooth period TZ must be less than last tooth periods TZ currently available in the memory. First range 303 ends where consecutive tooth periods TZ differ only negligibly.

Range 304 following first range 303 includes the interval of a slowly decelerating state of motion. In this second range 304, expected tooth period TZ, and thus also the dead time, is selected larger than instantaneously available tooth periods TZ.

The same applies to a third range 305, which follows second range 304. Second range 304 and third range 305 differ in that the difference between currently available tooth period TZ and tooth period TZ to be expected is considerably larger in third range 305 than in second range 304.

A fourth range 306, which follows third range 305, corresponds to first range 303 as far as expected tooth period TZ is concerned, since a deceleration of crankshaft 109 is also expected in fourth range 306.

Fifth range 307, which follows fourth range 305, corresponds to second range 304 with regard to expected tooth period TZ because a slow deceleration of crankshaft 109 is to be expected here, too.

The subdivision into ranges of different accelerations of crankshaft 109 is continued periodically for as long as internal combustion engine 100 is still in pendular motion during the run-down. Time characteristic 301 of the tooth periods is also subdividable into concave ranges and convex ranges. The concave and convex ranges alternately follow each other at points of inflection. The concave range is characterized by a low point, the convex range by a high point.

The differentiation of the ranges is meant to improve the approximation function and the extrapolation of the dead time. For instance, by comparing stored tooth periods TZ, first setpoint input device 121 ascertains in which range of first time characteristic internal combustion engine 100 happens to be. Depending on the range, the safety offset and the increment of the approximation method, for instance, are then adapted.

The quadratic extrapolation tends to supply excessive expected tooth periods in the concave case. The linear extrapolation tends to supply tooth periods that are too small in this case. Thus, both extrapolation methods define the range in which the expected tooth period will lie. The increments of the approximation method in the extrapolation are equal to the time interval between the two most recently detected tooth periods TZ, for instance.

Then the first specified threshold value, i.e., the dead time, is determined as a function of three values of the third variable. For the reliable detection of the standstill, for example, the dead time is used as maximum value of the two results from the linear and quadratic extrapolation. This avoids a too rapid detection of the standstill both for the convex and the concave case. Another selection, e.g., a weighted average value generation, is possible as well.

To be able to tolerate inaccuracies that result from the use of the approximation function, for instance, a safety offset, such as an additive term of 0.001 seconds per 6° arc of crankshaft rotation [S/6° CR], is added to the result of the extrapolation in addition. The value of the safety offset differs according to the range, for instance, and is adapted in an application. Then, first setpoint specification device 121 transmits the dead time to comparator 125.

Second setpoint specification device 122 outputs as specified second threshold value a relative rotational speed between the starter or electric motor 114 and crankshaft 109, which must be undershot before the engagement operation, i.e., the renewed startup of internal combustion engine 100, may take place by the starter. The relative rotational speed is specified by, for example, the manufacturer of the mechanical subsystems, e.g., pinion 116 and/or ring gear 117. The relative rotational speed amounts to approximately $$20 \frac{ms}{6° CA}$$

rotations per minute, for instance. The second specified threshold value is transmitted from second setpoint-specification device 122 to comparator 125.

Comparator 125 compares the first specified threshold value to the first variable, and/or the second specified threshold value to the second variable.

This means that comparator 125 uses the first variable to determine whether crankshaft 109 is already at rest, i.e., whether the time period that has elapsed since incremental encoder 112 detected the last tooth is greater than the dead time to be expected until the detection of the next tooth. This is the case especially when no information about the rotational speed of internal combustion engine 100 is available any longer because crankshaft 109 is in reverse-pendular motion R, for instance.

Comparator 125 also checks whether relative rotational speed R between starter or electric motor 114 and crankshaft 109 is smaller than the second specified threshold value.

If comparator unit 125 detects that internal combustion engine 100 is at standstill or that the relative rotational speed between the starter and crankshaft 109 is small enough, comparator 125 transmits a release signal to third setpoint specification device 126.

Typically, it is first checked whether the relative speed is small enough. If this is impossible because of missing information regarding the rotational speed, then it is checked whether internal combustion engine 100 is standing still. To this end, comparator 125 checks whether the rotational speed signal has a valid value.

Third setpoint specification device 126 controls electric motor 114 as a function of the release signal. For example, third setpoint-specification device 126 triggers electric motor 114 by a current when the starting operation has been enabled. For this, it is checked, for one, whether the release signal from comparator 125 enables the starting operation. For another, in a vehicle, for instance, it is checked whether a driver request for a renewed startup of internal combustion engine 100 has been received. An electrical signal from a start button installed in the vehicle, for example, is transmitted to third setpoint specification device 126 as startup request. In this case, electric motor 114 is triggered by third setpoint specification device 126 only if the start button is depressed or a corresponding electric signal is applied. As an alternative, the signal from a driving pedal is monitored and the startup request is detected when the driver depresses the driving pedal.

Figure 2:
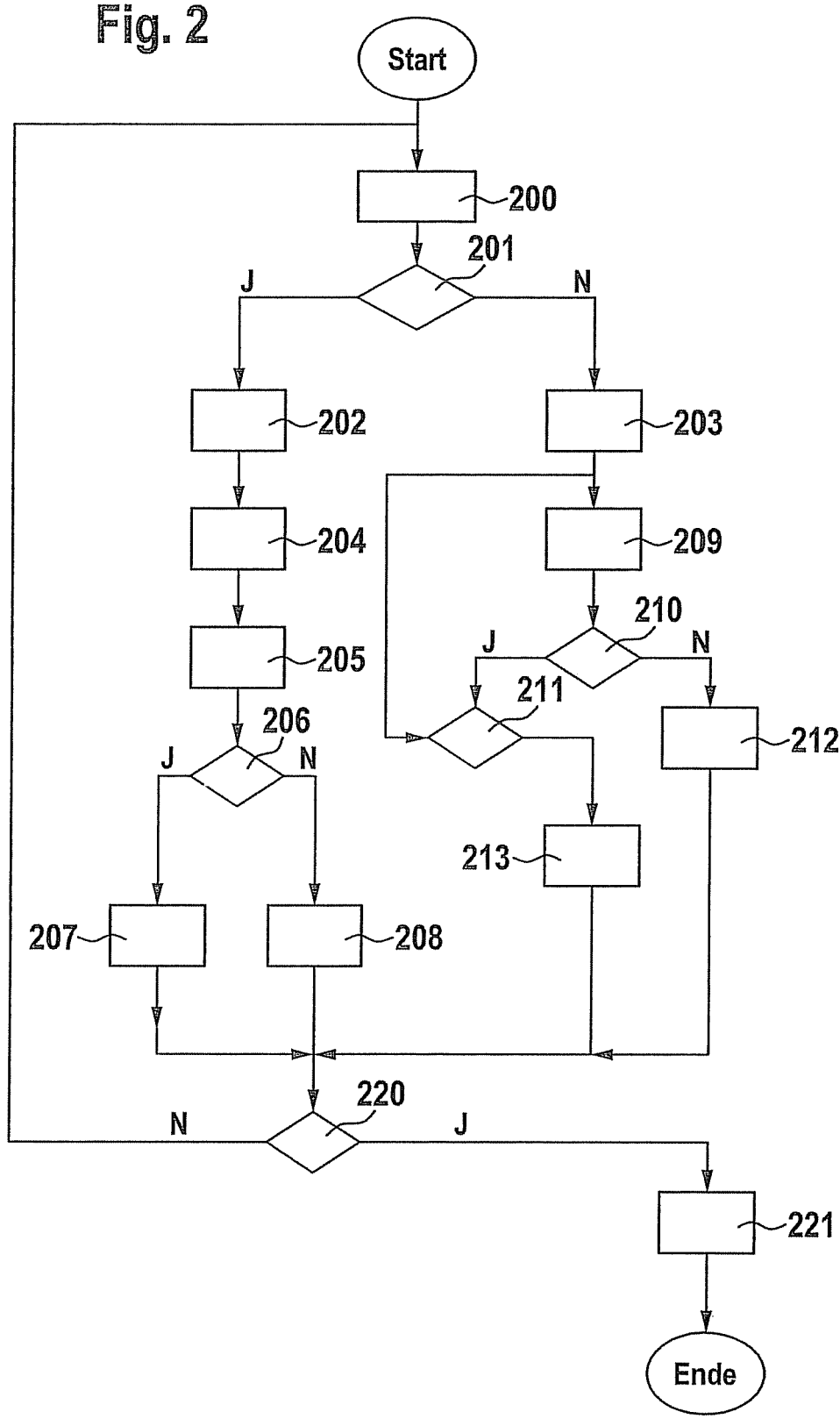
FIG. 2 is a flow chart of a method according to an example embodiment of the present invention.

FIG. 2 shows a flow chart of a method according to an example embodiment of the present invention.

The method is started in a step 200 as soon as internal combustion engine 100 transitions from the fired operating state into a first, non-fired operating state.

In step 200, engine speed n of internal combustion engine 100 is determined in the usual manner. Then a step 201 is executed.

In step 201 it is checked whether a valid value was transmitted for engine speed n of internal combustion engine 100. If engine speed n of internal combustion engine 100 was determined in a valid manner, then branching to a step 202 takes place. Otherwise, the method branches to a step 203.

In step 202, the second specified threshold value in input, i.e., the maximally permitted relative rotational speed between starter and crankshaft 109. Then a step 204 is executed.

In step 204, the rotational speed of the starter is determined, e.g., in a conventional, for example from a model of the starter. As an alternative, the rotational speed of the starter is measured by an incremental encoder, for example, at electric motor 114. Then a step 205 is executed.

In step 205, the difference between the rotational speed of the starter and engine speed n of internal combustion engine 100 is determined. Then a step 206 is executed.

In step 206, it is checked whether the second specified threshold value is greater than the difference between the rotational speed of the starter and engine speed n of internal combustion engine 100. If the difference between the rotational speed of the starter and engine speed n of internal combustion engine 100 is smaller than the second specified threshold value, then a step 207 is executed. Otherwise a step 208 is executed.

In step 207, a release signal is generated. For example, one bit is set to the value 1. Then a step 220 is executed.

In step 208, the release signal is reset. For example, the bit is set to the value 0. Then a step 220 is executed.

In step 203, the dead time that may elapse before the next tooth of magnet wheel 113 is detected by a new pulse, e.g., a falling flank of the voltage signal of incremental encoder 112. For instance, the dead time is determined from the approximation function as a function of tooth periods TZ by the described linear and/or quadratic extrapolation or by the least-square method. Then a step 209 is executed.

In step 209, the time is determined that has elapsed since the last tooth was detected. Then a step 210 is executed.

In step 210, it is checked whether the time that elapsed since the last tooth was detected is less than the dead period. If the time period that has elapsed since the last tooth is less than the dead period, then a step 211 is executed. Otherwise a step 212 is executed.

In step 211, it is checked whether a new tooth has been detected. If no new tooth was detected, branching to step 209 takes place. Otherwise the program branches to step 213.

In step 213, the release signal is reset. For example, the bit is set to the value 0. Then a step 220 is executed.

In step 212, the release signal is set. For example, the bit is set to the value 1. Then step 220 is executed.

In step 220, it is checked whether a start request of the internal combustion engine is present. For this purpose, it is checked, for instance, whether the signal of a start button in a motor vehicle has a value that corresponds to the start request. If a start request for internal combustion engine 100 is present, then a step 221 is executed. Otherwise step 200 is executed.

In step 221, the internal combustion engine is started in the known manner. Then the method is terminated.

In addition, the method is terminated at various other times, for example if the driver of the motor vehicle deactivates control device 120.

What is claimed is:

1. A device for operating an internal combustion engine having a starter, which is situated on a crankshaft of the internal combustion engine, comprising:
    a first setpoint selection device adapted to specify a first threshold value;
    a second setpoint selection device adapted to specify a second threshold value;
    a first determination device adapted to determine a first variable, which characterizes a run-down of the internal combustion engine;
    a second determination device adapted to determine a second variable, which characterizes a run-down of the internal combustion engine;
    a comparator adapted to compare at least of (a) the first variable to the specified first threshold value and (b) the second variable to the specified second threshold value; and
    a third setpoint selection device adapted to operate the starter by the crankshaft as a function of the comparison.

2. The device according to claim 1, wherein the third setpoint device operates the starter when at least one of (a) the comparison of the first variable indicates that a rotational speed of the crankshaft is below a level corresponding to the first threshold value and (b) the comparison of the second variable indicates that a relative rotational speed between the starter and the crankshaft is less than the second threshold value.

3. The device according to claim 2, wherein the comparator only compares the first variable when rotational speed information needed for the comparison of the second variable is unavailable, otherwise the comparator compares the second variable when the rotational speed information is available.

4. A method for operating an internal combustion engine having a starter, comprising:
    specifying a first threshold value and a second threshold value;
    determining a first variable and a second variable, which characterize an operating state of the internal combustion engine;
    at least one of (a) comparing the first variable to the specified first threshold value and (b) comparing the second variable to the specified second threshold value; and
    one of (a) starting and (b) not starting, by the starter, the internal combustion engine as a function of the comparison,
    wherein an incremental encoder is situated on a crankshaft in the internal combustion engine, and a time period is selected as the first variable that elapses after a first gear tooth of the incremental encoder has been detected.

5. The method according to claim 4, wherein a third variable is determined as a function of a time interval between a detection of two consecutive gear teeth of the incremental encoder, and the first specified threshold value is determined as a function of at least two values of the third variable, by extrapolation, using an approximation function of at least one of (a) a first and (b) a second order.

6. The method according to claim 5, wherein the first specified threshold value is selected as a function of a greater value of the two results from the extrapolation using the approximation function of the first and second order.

7. A method for operating an internal combustion engine having a starter, comprising:
    specifying a first threshold value and a second threshold value;

determining a first variable and a second variable, which characterize an operating state of the internal combustion engine;

at least one of (a) comparing the first variable to the specified first threshold value and (b) comparing the second variable to the specified second threshold value; and one of (a) starting and (b) not starting, by the starter, the internal combustion engine as a function of the comparison, wherein the first specified threshold value corresponds to a time period, which is selected as a function of at least one of (a) a rotational speed of the crankshaft and (b) a position of the crankshaft, and wherein the time period ranges between 10 ms and 100 ms.

8. A method for operating an internal combustion engine having a starter, comprising:

specifying a first threshold value and a second threshold value;

determining a first variable and a second variable, which characterize an operating state of the internal combustion engine;

at least one of (a) comparing the first variable to the specified first threshold value and (b) comparing the second variable to the specified second threshold value; and one of (a) starting and (b) not starting, by the starter, the internal combustion engine as a function of the comparison, wherein the second variable is selected as a function of a difference in rotational speeds between the starter and a crankshaft.

9. The method according to claim 8, wherein the starter starts up the internal combustion engine only if the first variable undershoots the specified first threshold value or if the second variable undershoots the specified second threshold value.

10. The method according to claim 8, wherein the first specified threshold value is corrected as a function of a tolerance factor.

11. The method according to claim 8, wherein the second specified threshold value is selected as a function of a mechanical loading capacity of at least one of (a) the starter and (b) a crankshaft.

12. The method according to claim 8, wherein it is checked whether a start request was made before the starter is operated.

13. The method according to claim 8, wherein the starter is a pinion starter.

14. The method according to claim 8, wherein the specified first threshold value and the specified second threshold value are selected greater than zero.

15. The method according to claim 8, wherein the internal combustion engine is started when at least one of (a) the comparison of the first variable indicates that a rotational speed of a crankshaft of the internal combustion engine is below a level corresponding to the first threshold value and (b) the comparison of the second variable indicates that a relative rotational speed between the starter and the crankshaft is less than the second threshold value.

16. The method according to claim 8, wherein the internal combustion engine is operated in an operating state in which no combustion takes place.

17. The method according to claim 15, wherein the comparing of the first variable is only performed when rotational speed information needed for the comparison of the second variable is unavailable, otherwise the comparing of the second variable being performed when the rotational speed information is available.

* * * * *